(12) United States Patent
Hutchin (10) Patent No.: US 8,045,178 B2
(45) Date of Patent: Oct. 25, 2011

(54) INTERFEROMETRIC TRACKING DEVICE

(75) Inventor: Richard A. Hutchin, Calabasas, CA (US)

(73) Assignee: Optical Physics Company, Calabass, CA (US)

(*) Notice: Subject to any disclaimer, the term of this patent is extended or adjusted under 35 U.S.C. 154(b) by 860 days.

(21) Appl. No.: 12/057,912

(22) Filed: Mar. 28, 2008

(65) Prior Publication Data

US 2010/0002242 A1    Jan. 7, 2010

(51) Int. Cl.
*G01B 9/02* (2006.01)
(52) U.S. Cl. .................................................. 356/521
(58) Field of Classification Search ................. 356/512, 356/520, 521
See application file for complete search history.

(56) References Cited

U.S. PATENT DOCUMENTS

| | | | | |
|---|---|---|---|---|
| 4,213,706 A * | 7/1980 | Hill et al. | .................. | 356/520 |
| 4,472,029 A * | 9/1984 | Hardy | .................. | 359/294 |
| 4,518,854 A * | 5/1985 | Hutchin | .................. | 356/521 |
| 4,737,621 A * | 4/1988 | Gonsiorowski et al. | ... | 250/201.9 |
| 5,629,765 A * | 5/1997 | Schmutz | .................. | 356/121 |
| 5,844,232 A * | 12/1998 | Pezant | .................. | 250/203.2 |
| 6,634,750 B2 * | 10/2003 | Neal et al. | .................. | 351/211 |
| 6,639,683 B1 * | 10/2003 | Tumbar et al. | .................. | 356/521 |
| 6,707,560 B1 * | 3/2004 | Naulleau et al. | .................. | 356/515 |
| 6,987,255 B2 * | 1/2006 | Smith | .................. | 250/201.9 |
| 7,038,791 B2 * | 5/2006 | Smith | .................. | 356/520 |
| 7,106,457 B1 * | 9/2006 | Stahl et al. | .................. | 356/521 |
| 7,283,251 B1 * | 10/2007 | Tansey | .................. | 356/512 |
| 7,333,215 B2 * | 2/2008 | Smith | .................. | 356/520 |
| 7,477,362 B2 * | 1/2009 | Asundi et al. | .................. | 356/35.5 |
| 2004/0260506 A1 * | 12/2004 | Jones et al. | .................. | 702/150 |
| 2005/0045801 A1 * | 3/2005 | Smith | .................. | 250/201.9 |
| 2005/0278126 A1 * | 12/2005 | Rosakis et al. | .................. | 702/42 |
| 2007/0038374 A1 * | 2/2007 | Belenkii et al. | .................. | 701/222 |
| 2007/0070327 A1 * | 3/2007 | Asundi et al. | .................. | 356/32 |
| 2007/0176077 A1 * | 8/2007 | Barchers | .................. | 250/201.9 |
| 2008/0017784 A1 * | 1/2008 | Hoot et al. | .................. | 250/203.4 |
| 2008/0075412 A1 * | 3/2008 | Vartuli et al. | .................. | 385/144 |
| 2010/0002242 A1 * | 1/2010 | Hutchin | .................. | 356/520 |

* cited by examiner

*Primary Examiner* — Patrick J Connolly
(74) *Attorney, Agent, or Firm* — Connolly Bove Lodge & Hutz LLP (57) ABSTRACT

An interferometric tracking device is disclosed. A first grating is optically coupled to a second grading such that the second grating is rotationally offset from the first grating. Imaging optics are adapted to image light passing through the first and second gratings onto a focal plane array. A plurality of wedge plates are optically disposed between the imaging optics and the second grating, such that the wedge plates generate a plurality of spots on the FPA when light from a point source is incident upon the first grating.

62 Claims, 5 Drawing Sheets

INTERFEROMETRIC TRACKING DEVICE

BACKGROUND OF THE INVENTION

1. Field of the Invention

The field of the present invention is optical tracking devices, particularly optical tracking devices that are used to determine the axial direction of an incoming beam of light.

2. Background

Optical tracking is a general purpose tool that can be used as an enabling technology in a broad range of applications. One example is determining the axial direction of a laser beam. For example, a suitably accurate optical tracker could be incorporated into a surface scanning device which, by sending out a laser beam towards a surface with unknown orientation and measuring the reflected beam's axial direction, determines the surface orientation with respect to the scanning device.

Optical tracking devices can be used aboard stationary or moving platforms to determine their position or orientation with respect to one or more light sources. Stellar tracking devices, commonly known in the art as a star sensor or a star tracker, are excellent examples of an application which permits the tracking of spacecraft orientation with respect to a known star field. Star trackers are critical components for space-based systems, regardless of whether such systems are purposed for terrestrial-based duties, e.g., detection, tracking, discrimination, or communication systems, or for non-terrestrial observations. The accuracy with which any of these duties may be performed from a space-based platform depends upon the accuracy of the position and orientation information available to the platform, and such information is most easily obtained from the tracking of stars (especially when used with a good GPS receiver).

A traditional star tracker images a star field using a controlled blur of star images to facilitate accurate pixel interpolation. Usually, each blurred star image resolves to an area of between 2×2 to 6×6 pixels on the image plane, and those pixels are processed to determine a local centroid for each star. Additional pixels around the resolved area are also frequently processed to provide data that may be used to correct for gradients in the background glow due to stray light. The typical centroid accuracy of traditional state of the art star trackers is $1/10^{th}$ to $1/50^{th}$ of a pixel. When a 2K×2K FPA is used to image a 20° field of view, the centroiding accuracy limits the directional accuracy to about 1-2 arcseconds. In order to improve on this accuracy, smaller fields of view are frequently used. However, a smaller field of view decreases the number of reliable star sources available for tracking and slows down the required measurement rate. The decreased field of view also reduces the slew rate capabilities of a star tracker, with the slew rate of currently available star trackers being no more than 1 deg/sec, and some being one or two orders of magnitude less. Moreover, the blurring technique used in such traditional star trackers makes the tracker highly dependent upon the spectral color of light emitted from stars. This results in star trackers that are less sensitive to certain stars, thereby limiting the number of stars useable for tracking purposes.

Traditional star tracking centroiding accuracy can be improved with high resolution FPA's. However, as the resolution of the FPA increases, so do the weight, volume, and power consumption of the star tracker. Moreover, with higher resolution FPAs, substantially more data must be processed, which leads to a greater weight for the star tracker and greater power being consumed by the processor tasked with crunching the data. Also, higher resolution FPAs tend to be more susceptible to radiation damage, with some of the most accurate star trackers currently available being damaged by as little as 15 krad to 20 krad of radiation exposure.

SUMMARY OF THE INVENTION

The present invention is directed toward an interferometric tracking device and method of tracking the relative position of a light source. The device includes first and second gratings optically coupled together, with the second grating rotationally offset from the first grating. Imaging optics image light passing through the first and second gratings onto a focal plane array (FPA). A plurality of wedge plates are optically disposed between the imaging optics and the second grating. The wedge plates are adapted to generate a plurality of spots on the FPA when light from a point source is incident upon the first grating.

The device may be constructed with additional options to improve the tracking capabilities and make it better suited for use on space based platforms. As one option, the first grating is constructed to produce an interference pattern which minimizes the zero order peak for broad spectrum white light. In another option, one or both gratings are etched onto sapphire substrates. In yet another option, the FPA has a minimum resolution of 128×128 pixels. In still another option, the wedge plates may comprise four wedge plate pairs, and each pair by be used to generate a single spot on the FPA from the point source. Further, the spot generated by each wedge plate pair is independently distinguishable from the spots generated by the other wedge plate pairs.

The device may additionally include an image intensifier optically disposed between the imaging optics and the FPA and a reducer optically disposed between the image intensifier and the FPA. The image intensifier may comprise a phosphor screen, and the image reducer may comprise a lens or a fiber coupler. In addition, the device may include a processor in electronic communication with the FPA. The processor is programmed to receive signals from the FPA and estimate a relative coarse position of the point source from a centroid of the spots on the FPA and to estimate a relative fine position of the point source from relative intensities of the spots on the FPA.

The method of tracking relative position of a light source comprises receiving light from the source into an aperture and generating a fringe using light from the point source. A plurality of images of the fringe is generated on the FPA. From those images, a relative coarse position and a relative fine position are estimated. The relative coarse position is estimated from a centroid of the images on the FPA, and the relative fine position is estimated from relative intensities of the images. The relative movement of the point source may be tracked using successive estimates of the coarse and fine positions. Options discussed above in relation to the device may be incorporated into the method.

Accordingly, an improved interferometric tracking device and methods determining the relative position of a light source are disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

The term "point source" as used herein is defined as a source of light which can considered as being effectively emitted from a single point. The following are examples of point sources, and are in no way intended to limit the definition:

1. Parallel beams of light confined to a sufficiently small diameter, such as that emitted from most common tabletop lasers;
2. Light emitted from a distant source, such as a star;
3. Light from a diffuse light source reflected off an object, such as sunlight reflected off an orbiting body, e.g., a satellite or other space-based platform, when seen or detected at a significant distance;
4. Light from a laser reflected off of an object or surface; and
5. Light emitted from a diffuse light source passed through a pin hole.

Figure 1:
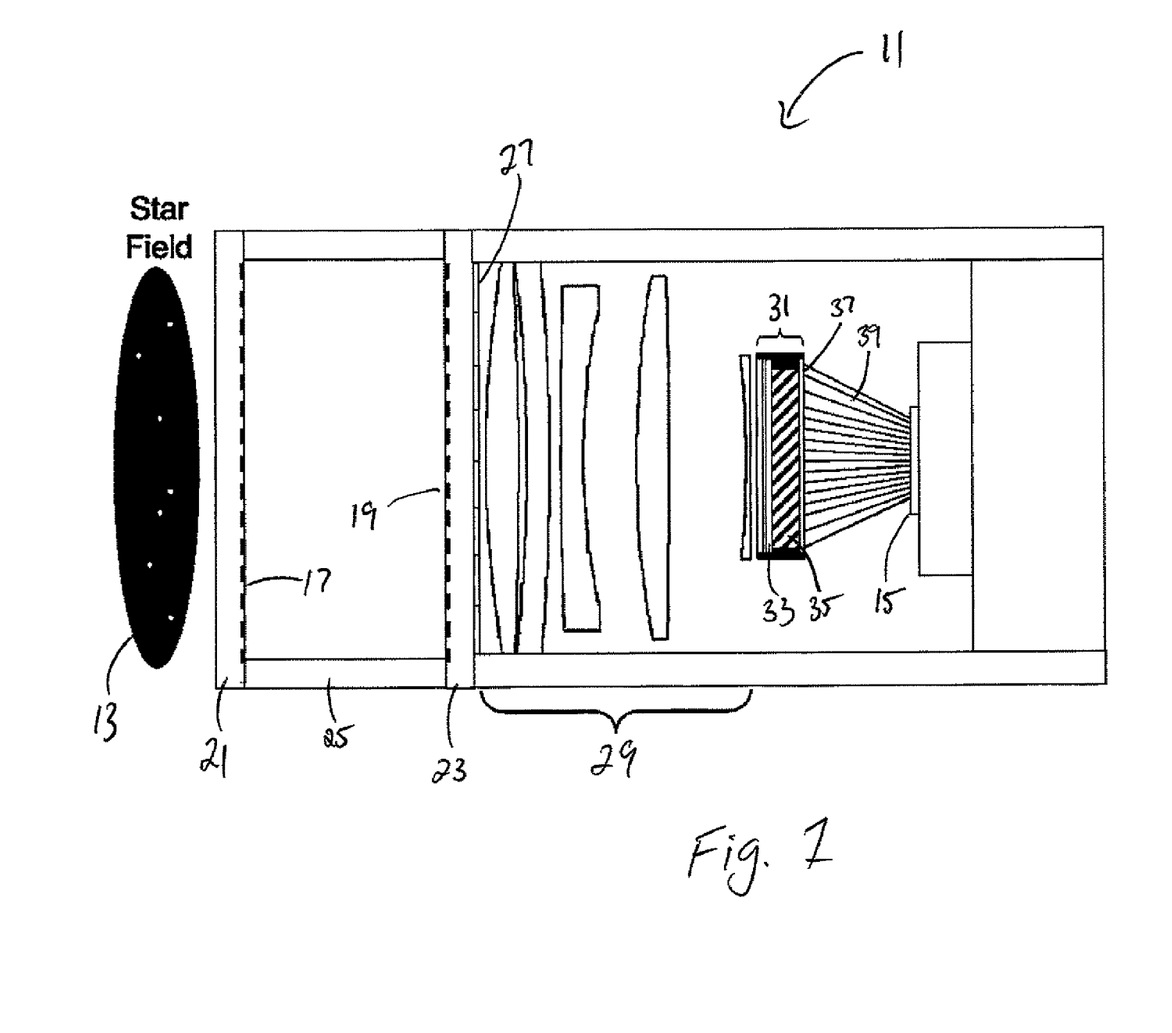
FIG. 1 is a schematic illustration of a first interferometric tracking device.

Turning in detail to the drawings, FIG. 1 illustrates an interferometric tracking device 11 which is particularly well suited for tracking stars when incorporated into a space-based platform. The design of the interferometric tracking device 11 uses parts that are inherently, or have been shown to be through testing or use, radiation hardened and capable of operating in environments having a wide thermal range, between at least −65° C. to +65° C. In addition, unlike star trackers known in the prior art, the interferometric star tracker 11 is capable of operating at slew rates of at least up to 2 deg/sec.

The interferometric tracking device 11, when incorporated into a space-based platform, is used to image a star field 13 onto a focal plane array (FPA) 15. Two gratings 17, 19 at the input aperture of the interferometric tracking device 11 form a white light shearing interferometer, such interferometers being known to those of skill in the art for over 40 years. The first grating 17 is a Ronchi phase grating and is etched onto the backside of a first sapphire lens 21. The second grating 19 is also a Ronchi phase grating and is etched onto the front side of a second sapphire lens 23. The second grating 19 is rotated about the optical axis of the input aperture so that the pattern of the second grating 19 is at a slight angle to the pattern of the first grating 17, thereby enabling the two gratings 17, 19 to generate fringes light incident upon the input aperture. Particularly, the relative rotation between the two gratings is such that two fringes are generated across the diameter of the beam, although depending on the design and intended use, the gratings may be rotationally aligned to generate more or fewer fringes. Spacing between the two lenses, and thus the gratings, is maintained by a sapphire spacer 25.

When the interferometric tracking device is incorporated into a space-based platform, preferred choices in the type of grating have been identified. As indicated above, a Ronchi phase grating is used for the star tracker. In addition, sapphire is the material of choice for the grating lenses and the spacer. Sapphire is naturally radiation hard, with only about 2.5% transmission loss from a 300 KRad exposure, and presents negligible issues when exposed to the thermal environment of space. The use of sapphire thus enables tight tolerances for separation of the gratings to be established and maintained, even in space. Other materials may also be suitable for use with space-based platforms, and depending upon the deployment environment, different materials may be used for the gratings and spacer. The same material is used for the spacer as for the grating lenses so that the three parts have the same response to indirect environmental thermal variations. However, even when the first sapphire lens 21 is exposed to direct solar heating, the thermal effects on the overall system are negligible.

In addition, for space-based platform deployment, the specifications for each of the gratings are selected to minimize color dispersion, minimize higher order interference peaks, and minimize the zero order interference peak for broad spectrum white light. By minimizing the color dispersion, the interferometer is rendered substantially achromatic and insensitive to star color, and since color dispersion of a grating is proportional to $1/period^2$, gratings with longer periods are more suitable for the task. Conversely, higher order interference peaks (beyond the +1 and −1 peaks) are typically minimized by selection of gratings with shorter periods. Since minimizing color dispersion and suppressing higher order interference peaks have reverse relationships with the period of the gratings, another method of suppressing higher order interference peaks is employed. The combination of using a wide spectral band, on the order of 530 nm to 850 nm, with ¼ cycle spatial averaging when measuring the four quadrature sine-wave signals aids in suppressing the impact of higher order interference peaks to about 0.6 μrads over the full field of view. A Ronchi phase grating having a period of 50 μm has been found to work well for star tracking purposes. In addition, a separation of 5 cm has been found to work well between two such Ronchi phase gratings. Other types of gratings, with other periods, and other separations between the gratings, may be used depending upon the functional requirements of the tracking device.

Figure 2A:
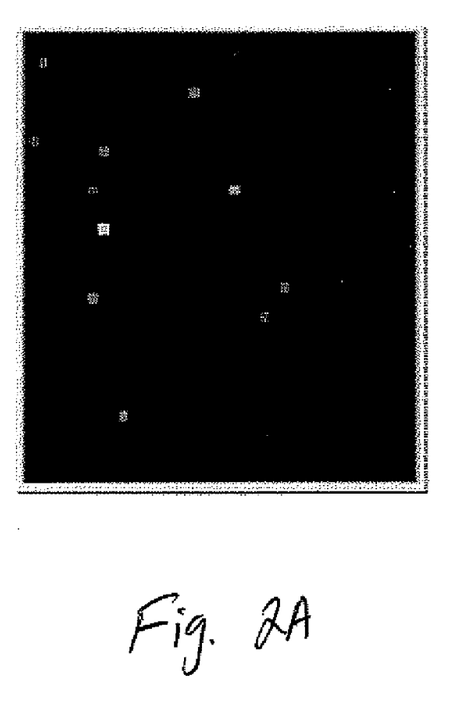
FIG. 2A is an image of a sample star field.
Figure 2B:
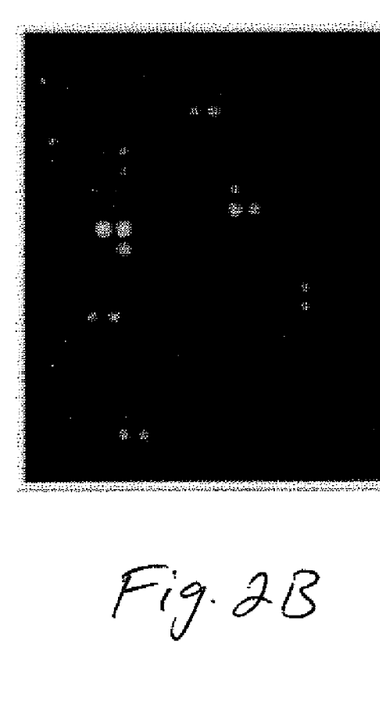
FIG. 2B is a representative image of the sample star field of FIG. 2A on the FPA in the tracking device of FIG. 1.
Figure 4A:
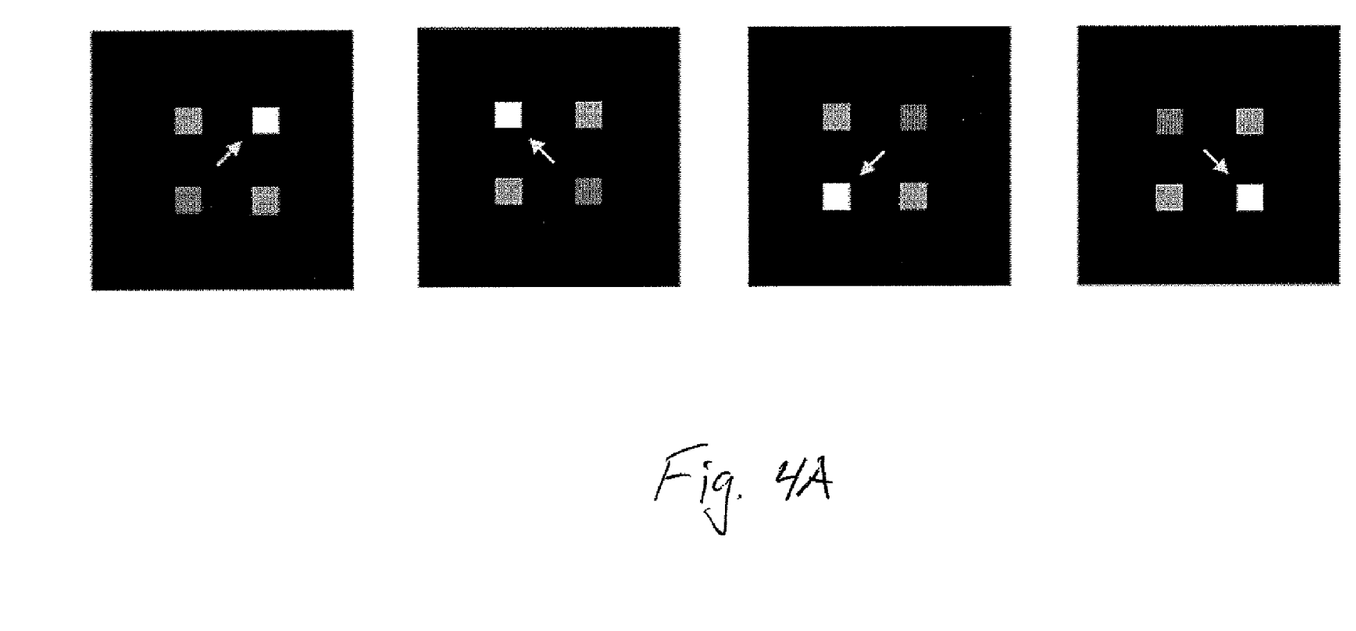
FIG. 4A illustrates in four frames the intensity of spots from a point source on an FPA.

After the gratings 17, 19, light passes through eight wedge plates 27, also constructed from sapphire. Each wedge plate 27 has a basic wedge shape, with the output surface being disposed at a preselected angle to the input surface. Next, imaging optics 29 image spots from the wedge plates 27 onto a channel plate intensifier 31. The relative angle of the output surface to the input surface for each wedge plate 27 is chosen so that each of the four pair of wedge plates 27 generates an independently distinguishable spot on the channel plate intensifier 31. To enable a course position estimate, described in more detail below, the wedge plates 27 are configured to generate the four spots in a square pattern, each spot at one corner of the pattern. FIG. 2A shows a sample star field, and FIG. 2B shows the spot pattern generated for each star within the field. Note that the fourth spot associated with each star within the field appears not present because of point within the cycle that the image represents. Each of the frames in FIG. 4A shows all four spots in a representative illustration. In generating four spots from a pair of wedge plates 27, light passing through each wedge plate 27 of a pair is optically combined at the channel plate intensifier 31. Optically combining light in this manner aids in reducing noise in the form of zero order interference peaks which may be generated by incident light from outside of the target spectrum or from outside of the field of view of the tracking device. The end result is a total of four spots, one from each of the four pair of wedge plates, forming a quadrature signal representative of the angle of incidence of star light upon the first grating 17. The intensity of each spot is a sinusoidal signal having a phase that differs from the phase of two of the other spots by approximately 90°, and from the phase of the last spot by approximately 180°.

Fewer or more than eight wedge plates may be used in the tracking device, although a minimum of four wedge plates are needed to establish a quadrature sinusoidal signal, which is used for estimating the angle of incident light. When four wedge plates are employed, noise from zero order or higher order interference peaks will remain so long as the source of the noise is present or another method of suppressing those peaks is introduced.

Each of the spots is imaged onto the photocathode 33 of the channel plate intensifier 31. The photocathode 33 generates free electrons which accelerate across a large potential generating a cascade of electrons through the 6-12 micron wide channels 35. Electrons are in turn further accelerated until they hit a screen 37 coated with a luminescent phosphor, which converts the kinetic energy of the electrons into green light. This green light produces approximately 1,600 photons for every photon imaged onto the photocathode 33, and the photons are sent down a tapered fiber bundle 39 to the FPA 15. After losses due to the tapered fibers, about 200 of the photons hit the FPA 15 and are converted into signal electrons. For space-based deployment, benefits are realized by incorporation of the intensifier because the preferred FPA has an increase in dark current associated with 400 KRad (Si) exposure, and that increase in dark current is accommodated by increase in the optical gain. ITT Corporation, of White Planes, N.Y., manufactures an image intensifier, model No. ITT FS9925, which is suitable for incorporation into the tracking device for use in space. Depending upon the deployment environment, the image intensifier is optional, as the tracking device can be fully functional without intensification of the signal.

The tapered fiber bundle 39 is used as a method of reducing the overall image size so that a relatively small, off-the-shelf FPA may be incorporated into the tracking device and used with an off-the-shelf image intensifier. A tapered fiber bundle having a 2:1 taper is suitable for use with the preferred image intensifier and FPA disclosed herein for use in a star tracker. Like the image intensifier, depending upon the deployment environment and other design considerations, the tapered fiber is optional.

As compared to star trackers known in the prior art, which require focal plane arrays having 2K×2K pixels in order to increase the slew rate capabilities, an FPA having a resolution of 512×512 pixels, or even as low as 128×128 pixels, may be used without sacrificing the ability to accommodate high slew rates. Of course, an FPA having higher pixel resolution may also be used. FPAs from Teledyne Scientific & Imaging, LLC, of Thousand Oaks, Calif., using Teledyne's HyViSI™ design, are suitable for space-based tracking devices.

The star tracker 11 described above is capable of tracking any desired number of stars within its field of view, such as is shown in FIG. 2A, although typically only a small selection of the brightest stars within the field of view are simultaneously tracked. In addition, the star tracker 11 is anticipated to have a full 20 degree field of view, be capable of maintaining a single source accuracy of less than 1 arc seconds (3 sigma) while accommodating a slew rate of up to 2 deg/sec, and be capable of withstanding radiation exposure of at least 350 KRad. Lower slew rates or faster focal plane read out will allow higher accuracy tracking by increasing the shear distance in the grating interferometer. Depending upon the design particulars of the tracking device, the field of view, slew rate, source accuracy, and radiation exposure capabilities may be different, larger or smaller, as compared to the embodiment of the star tracker discussed herein.

While a star tracker of this type could alternatively be constructed using the gratings and the wedge plates as the interferometric front end to a star tracker as known in the prior art, such a construction could serve as a functional tracking device, although it might not achieve the technical specifications desired for use on a space-based platform.

Figure 3:
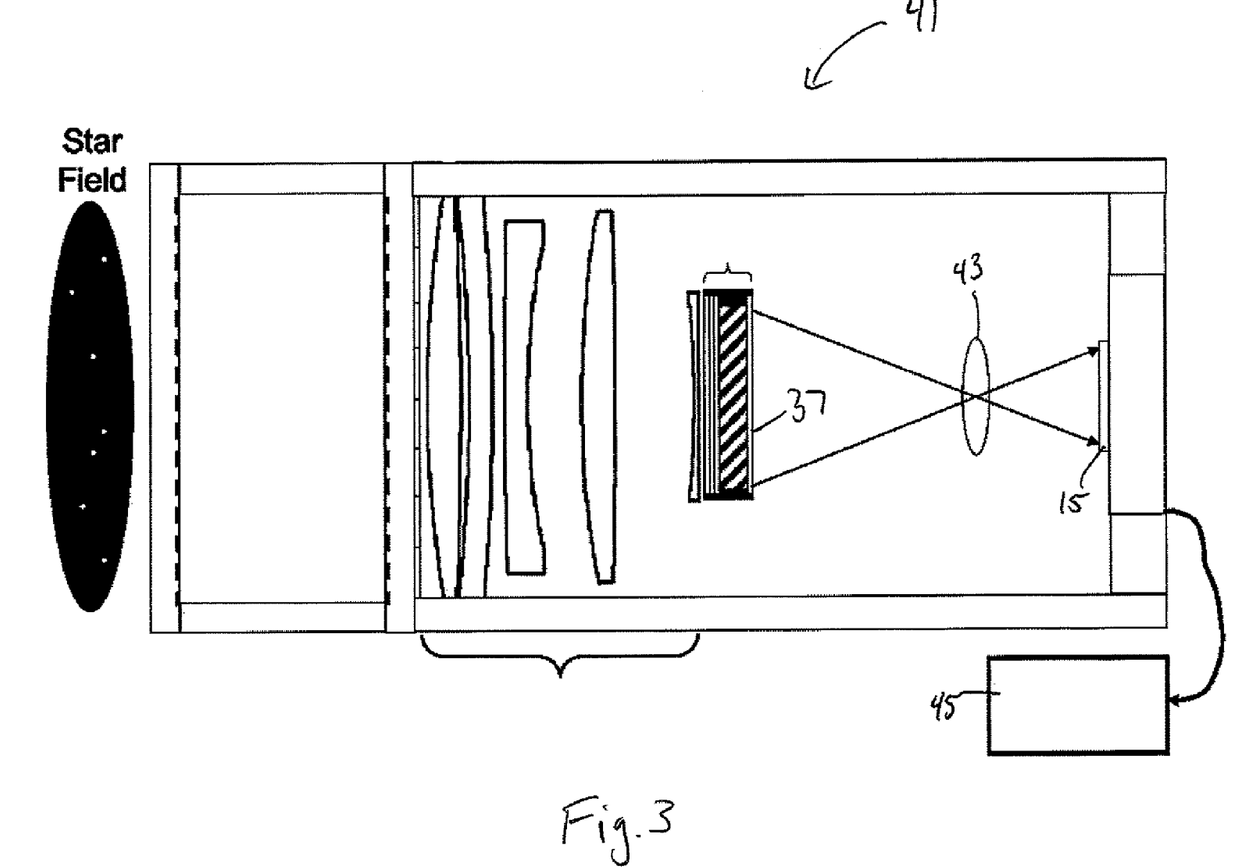
FIG. 3 is a schematic illustration of a second interferometric tracking device.

A second design for a tracking device 41 is shown in FIG. 3. This tracking device 41 is similar to the tracking device 11 shown in FIG. 1, except the tapered fiber bundle has been replaced with an imaging lens 43. The imaging lens 43 images the phosphor screen 37 onto the FPA 15 and provides essentially the same functionality as a tapered fiber bundle. The tracking device 41 is also shown with an external processor 45 linked to the FPA 15, although the tracking device could also be designed with an internal processor.

The processor 45 receives electronic signals output from the FPA 15 and uses those signals to determine a coarse angle of incidence and a fine angle of incidence for each individual point source within the field of view of the tracking device 41. The angle of incidence, once obtained, is used to determine the position of the point source within the field of view of the tracking device, and thereby the relative position of the point source to the tracking device. The coarse angle of incidence is determined by estimating the centroid of the four spots generated by a point source on the FPA. Using the 512×512 FPA referenced above, the centroid is smaller than a single pixel on the FPA, meaning that the position of the centroid within the pixel can be determined to within limited amount of accuracy from the position of the four spots on the FPA. However, unlike the star trackers of the prior art, since the quadrature signal of the four spots provides a fine determination of the angle of incidence, no blurring of the images are necessary to increase accuracy. In addition, because the centroid of the four spots is designed to remain within a single pixel for at least a full phase cycle of the spots, it is possible to estimate the coarse position only once per cycle, whereas the fine position is estimated at least four times per cycle. As an option, the coarse angle of incidence may be re-estimated only when the centroid of the spots crosses the boundary between two pixels on the FPA. The coarse angle of incidence may be determined to within ±30 arcseconds using the tracking device as described above. With the addition of the fine position estimate, the relative position of the point source may be determined, through interpolation of the data, to within 0.1 arcseconds or better.

Figure 4B:
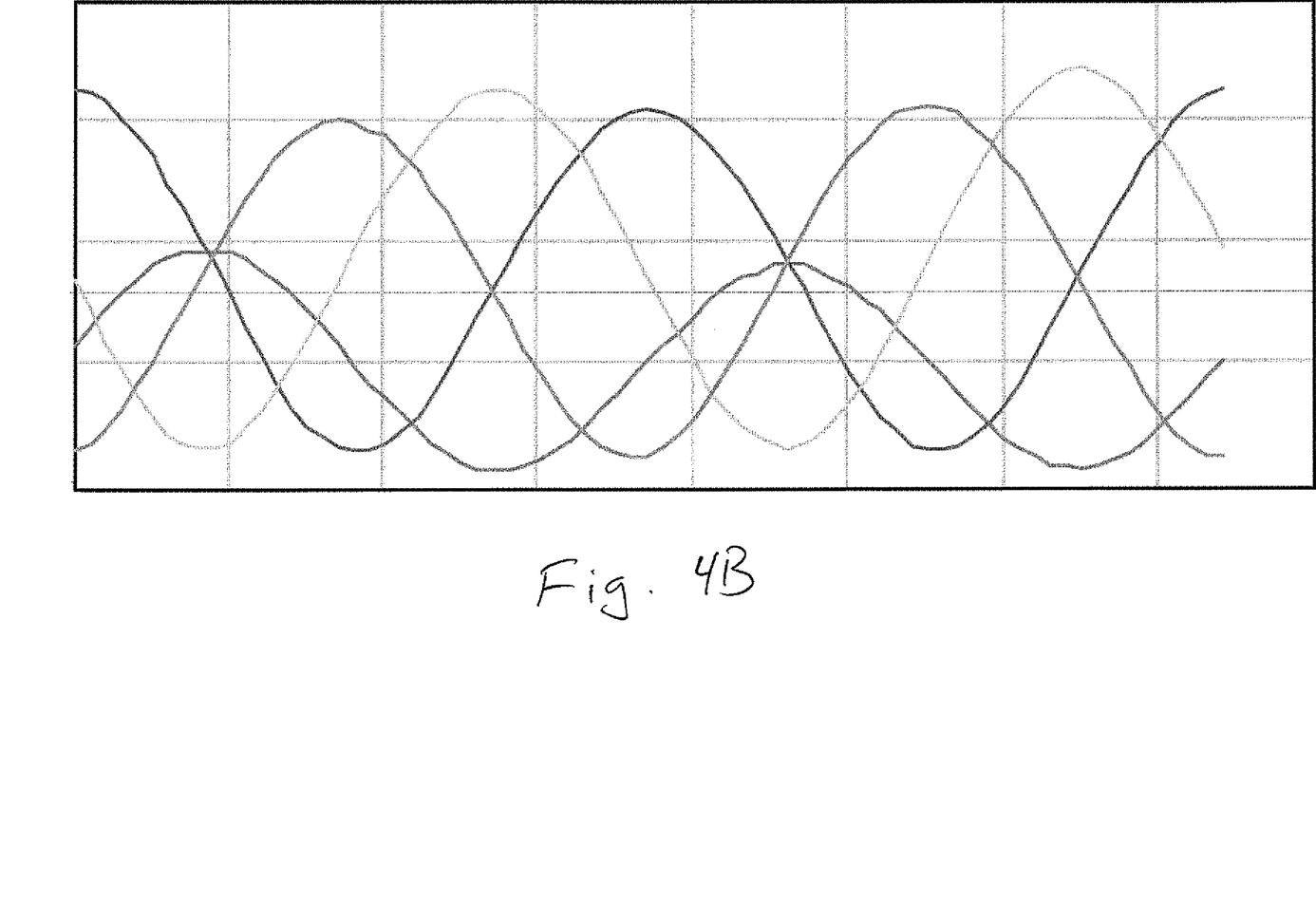
FIG. 4B illustrates the oscillating intensity signals generated on an FPA.

FIG. 4A shows, in four frames, the oscillating intensity of four spots on the FPA that would be generated from a single point source. The spot notated by the arrow in each frame has the greatest intensity. As can be seen, the position of the spot with the greatest intensity effectively rotates among the four spots. In practice, the direction of rotation will depend upon the relative motion of the point source to the tracking device—relative motion in one direction will produce clockwise rotation, while relative motion in the opposite direction will produce counterclockwise rotation. FIG. 4B is a graph showing the relative intensities of the four spots over two interferometer phase cycles. The process of converting such a quadrature signal into a phase estimate is well understood by those skilled in the art. The phase has been found to be extremely linear with angle of incidence over a 20° field of view and can be interpolated to better than $1/1000^{th}$ of a cycle. Thus, the phase estimate is easily converted into a fine determination of the relative position of the point source with respect to the tracking device. As the tracking device described above is designed, the phase goes through one cycle per pixel on the FPA and through approximately 500 cycles across a 20 degree field of view. The number of phase cycles per pixel and the number of cycles across the entire field of view are a matter of design, and can be changed to suit the needs of the deployment environment.

The tracking device described above is capable of improving tracking accuracy along a single axis. The off-axis of a single tracking device will have accuracy no greater than that of the coarse position estimate. Two tracking devices may be coupled together for increased tracking accuracy along two axes, and three may be coupled for improved tracking accuracy along three axes.

Thus, an improved interferometric tracking device and method of tracking the relative movement of a point source are disclosed. While embodiments of this invention have been shown and described, it will be apparent to those skilled in the art that many more modifications are possible without departing from the inventive concepts herein. For example, the concepts and principles presented as part of the star tracker disclosed herein may be applied to tracking the relative position of any point source, or any effective point source outside the field of star tracking. The invention, therefore, is not to be restricted except in the spirit of the following claims.

What is claimed is:

1. An interferometric tracking device comprising:
   a shearing interferometer,
   an image divider adapted to generate a plurality of images for each of one or more light sources from which light is incident upon the shearing interferometer, and
   a focal plane array (FPA) optically coupled to the image divider to receive the plurality of images.

2. The device of claim 1, wherein the shearing interferometer comprises
   a first grating; and
   a second grating optically coupled to and rotationally offset from the first grating.

3. The device of claim 2, wherein a combination of the first and second gratings is adapted to produce an interference pattern which minimizes a zero order peak for broad spectrum white light.

4. The device of claim 2, further including a spacer between the first grating and the second grating, wherein the first and second gratings are etched onto first and second substrates, respectively.

5. The device of claim 4, wherein the first and second substrates and the spacer are formed from a first material.

6. The device of claim 2, wherein the first grating is etched onto a first sapphire substrate, and the second grating is etched onto a second sapphire substrate.

7. The device of claim 1, further comprising imaging optics adapted to image the plurality of images onto the FPA.

8. The device of claim 7, wherein the image divider comprises a plurality of wedge plates.

9. The device of claim 7, wherein a combination of the imaging optics and each wedge plate is adapted to generate a spot on the FPA when light from a point source is incident upon the shearing interferometer.

10. The device of claim 9, wherein the plurality of wedge plates comprises four wedge plate pairs, each wedge plate pair, in combination with the imaging optics, being adapted to generate a single spot on the FPA from the point source.

11. The device of claim 10, wherein the spot generated by each wedge plate pair is independently distinguishable from the spots generated by the other wedge plate pairs.

12. The device of claim 1, further comprising an image intensifier optically disposed between the image divider and the FPA.

13. The device of claim 12, wherein the image intensifier comprises a channel plate intensifier having a phosphor screen.

14. The device of claim 1, further comprising an image reducer optically disposed between the image divider and the FPA.

15. The device of claim 14, wherein the image reducer comprises one or more lenses.

16. The device of claim 14, wherein the image reducer comprises a fiber coupler.

17. The device of claim 1, wherein the FPA has a minimum resolution of 128×128 pixels.

18. The device of claim 1, further comprising a processor in electronic communication with the FPA, the processor being adapted to estimate a relative coarse position of the point source from a centroid of the spots on the FPA and to estimate a relative fine position of the point source from relative intensities of the spots on the FPA.

19. An interferometric tracking device comprising:
   a shearing interferometer;
   an image divider adapted to generate a plurality of images of for each of one or more light sources from which light is incident upon the shearing interferometer;
   a focal plane array (FPA); and
   imaging optics optically coupled between the image divider and the FPA, wherein a combination of the image divider and the imaging optics is adapted to generate the plurality of images on the FPA.

20. The device of claim 19, wherein the shearing interferometer comprises
   a first grating; and
   a second grating optically coupled to and rotationally offset from the first grating.

21. The device of claim 20, wherein a combination of the first and second gratings is adapted to produce an interference pattern which minimizes a zero order peak for broad spectrum white light.

22. The device of claim 20, further including a spacer between the first grating and the second grating, wherein the first and second gratings are etched onto first and second substrates, respectively.

23. The device of claim 22, wherein the first and second substrates and the spacer are formed from a first material.

24. The device of claim 22, wherein the first grating is etched onto a first sapphire substrate, and the second grating is etched onto a second sapphire substrate.

25. The device of claim 19, wherein the image divider comprises a plurality of wedge plates.

26. The device of claim 25, wherein a combination of the imaging optics and each wedge plate is adapted to generate a spot on the FPA when light from a point source is incident upon the shearing interferometer.

27. The device of claim 26, wherein the plurality of wedge plates comprises four wedge plate pairs, each wedge plate pair, in combination with the imaging optics, being adapted to generate a single spot on the FPA from the point source.

28. The device of claim 27, wherein the spot generated by each wedge plate pair is independently distinguishable from the spots generated by the other wedge plate pairs.

29. The device of claim 19, wherein the FPA has a minimum resolution of 128×128 pixels.

30. The device of claim 19, further comprising an image intensifier optically disposed between the image divider and the FPA.

31. The device of claim 30, wherein the image intensifier comprises a channel plate intensifier having a phosphor screen.

32. The device of claim 19, further comprising an image reducer optically disposed between the image divider and the FPA.

33. The device of claim 32, wherein the image reducer comprises one or more lenses.

34. The device of claim 32, wherein the image reducer comprises a fiber coupler.

35. The device of claim 19, further comprising a processor in electronic communication with the FPA, the processor being adapted to estimate a relative coarse position of the point source from a centroid of the spots on the FPA and to estimate a relative fine position of the point source from relative intensities of the spots on the FPA.

36. An interferometric tracking device comprising:
a shearing interferometer;
an image divider adapted to generate a plurality of images of for each of one or more light sources from which light is incident upon the shearing interferometer;
a focal plane array (FPA);
an image intensifier optically disposed between the image divider and the FPA;
an image reducer optically coupling the image intensifier to the FPA; and
imaging optics adapted to image light passing through the image divider onto the image intensifier.

37. The device of claim 36, wherein the shearing interferometer comprises
a first grating; and
a second grating optically coupled to and rotationally offset from the first grating.

38. The device of claim 37, wherein a combination of the first and second gratings is adapted to produce an interference pattern which minimizes a zero order peak for broad spectrum white light.

39. The device of claim 37, further including a spacer between the first grating and the second grating, wherein the first and second gratings are etched onto first and second substrates, respectively.

40. The device of claim 39, wherein the first and second substrates and the spacer are formed from a first material.

41. The device of claim 37, wherein the first grating is etched onto a first sapphire substrate, and the second grating is etched onto a second sapphire substrate.

42. The device of claim 36, wherein the image divider comprises a plurality of wedge plates.

43. The device of claim 42, wherein a combination of the imaging optics and each wedge plate is adapted to generate a spot on the FPA when light from a point source is incident upon the shearing interferometer.

44. The device of claim 43, wherein the plurality of wedge plates comprises four wedge plate pairs, each wedge plate pair, in combination with the imaging optics, being adapted to generate a single spot on the FPA from the point source.

45. The device of claim 44, wherein the spot generated by each wedge plate pair is independently distinguishable from the spots generated by the other wedge plate pairs.

46. The device of claim 36, wherein the FPA has a minimum resolution of 128×128 pixels.

47. The device of claim 36, wherein the image intensifier comprises a channel plate intensifier having a phosphor screen.

48. The device of claim 36, wherein the image reducer comprises one or more lenses.

49. The device of claim 36, wherein the image reducer comprises a fiber coupler.

50. The device of claim 36, further comprising a processor in electronic communication with the FPA, the processor being adapted to estimate a relative coarse position of the point source from a centroid of the spots on the FPA and to estimate a relative fine position of the point source from relative intensities of the spots on the FPA.

51. A method of determining a position of a source of light, the method comprising:
receiving light from the source into an aperture;
generating a fringe using received light from the source;
generating a plurality of images of the fringe on a focal plane array (FPA);
estimating a relative coarse position of the source from a centroid of the images on the FPA; and
estimating a relative fine position of the source from relative intensities of the images.

52. The method of claim 51, wherein generating the fringe includes passing light from the point source through a first grating and a second grating, the second grating being rotationally offset from the first grating.

53. The method of claim 51, wherein generating the plurality of images of the fringe includes optically combining optically combining two or more of the plurality of images.

54. The method of claim 51, wherein generating the plurality of images of the fringe includes generating eight images of the fringe.

55. The method of claim 54, wherein generating eight images of the fringe includes optically pairs of the images to form four spots on the FPA.

56. The method of claim 51, wherein estimating the relative coarse position includes determining an angle of incidence of light from the point source relative to the aperture.

57. The method of claim 56, wherein estimating the relative fine position includes determining an angle of incidence of light from the point source relative to the aperture.

58. The method of claim 51, wherein estimating the relative fine position includes determining the phase change of light from the point source from the relative intensities of the images generated on the FPA.

59. The method of claim 51, wherein estimating the relative fine position includes estimating a sinusoidal phase of light from the point source through quadrature sampling of the images generated on the FPA.

60. The method of claim 51, further comprising tracking relative movement of the source from successive estimates of the coarse position and fine position.

61. The method of claim 60, wherein tracking relative movement of the point source includes tracking relative movement of the point source from cumulative phase changes of the images generated on the FPA.

62. The method of claim 51, further comprising intensifying the images of the point source generated on the FPA.

* * * * *